(12) United States Patent
Gaub et al.

(10) Patent No.: US 6,469,134 B2
(45) Date of Patent: Oct. 22, 2002

(54) REVERSIBLY SWITCHABLE CROSS-LINKING OF MONOMERS

(75) Inventors: Hermann Gaub, Rotwandhaus; Andreas Mittelbach, Unterhaching; Peter Jaenker, Garching; Felix Nitschké, Munich; Ulrich S. Schubert, Ismaning, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/767,109

(22) Filed: Jan. 22, 2001

(65) Prior Publication Data

US 2001/0014731 A1 Aug. 16, 2001

(30) Foreign Application Priority Data

Jan. 22, 2000 (DE) .......................... 100 02 698

(51) Int. Cl.$^7$ ................................. C08F 6/00
(52) U.S. Cl. ...................................... 528/480
(58) Field of Search ........................... 528/480

(56) References Cited

U.S. PATENT DOCUMENTS 4,022,649 A  5/1977  Nakagone et al. .......... 156/309

OTHER PUBLICATIONS

Chemical Abstracts 132, No. 237487, "Design, synthesis and first metal complexes of dentritic 5,5"–disubstituted 2,2'–:6'2" terpyridine ligands" 1999.
Chemical Abstracts 132, No. 181392, "Designated functionalized block copolymers with metal complexing terpyridine units" 1999.

Primary Examiner—Terressa M. Boykin

(74) Attorney, Agent, or Firm—Davidson, Davidson & Kappel, LLC

(57) ABSTRACT

A method for reversibly switchable cross-linking of monomers includes cross-linking the monomers by adding complexable metal ions to form a polymer, and bond-breaking the polymer formed by applying a direct voltage, by changing the pH value or by changing the temperature. The monomers include compounds of the general formulas

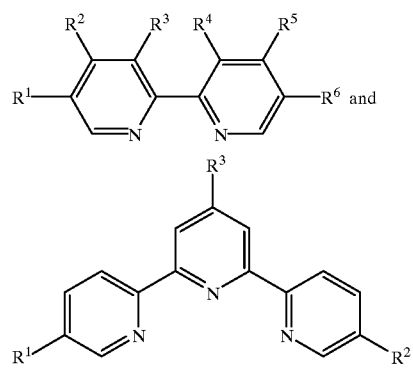

$R^1$ through $R^6$ may be equal or different and are selected from the group consisting of H, OH, $-NX_2$, $-OX$, $-SH$, and $-SX$, with X being selected from alkyl and/or aryl groups which are terminally substituted by reactive residues selected from the group consisting of OH, $-CH(O)CH_2$, $-NCO$, $-COOH$ and $NZ_2$. Z is selected from the group consisting of alkyl groups, aryl groups and a hydrogen atom, one of the groups Z being a hydrogen atom with the proviso that not all residues $R^1$ through R are hydrogen atoms at the same time. Repeated cross-linking of the bond-broken polymer may be carried out by applying a direct voltage opposite in polarity to the direct voltage of the bond-breaking step, by changing the pH value, or by changing the temperature.

10 Claims, 1 Drawing Sheet

REVERSIBLY SWITCHABLE CROSS-LINKING OF MONOMERS

FIELD OF THE INVENTION

The present invention relates to a method for reversibly switchable cross-linking of monomers.

RELATED TECHNOLOGY

During the manufacture of conventional polymers, an irreversible cross-linking takes place. During all bond-breaking reactions of these polymers, the structural elements of the polymers are irreversibly destroyed. In addition, the amount of energy needed for bond-breaking/destroying the known polymers is relatively large. Therefore, it is not possible to switch back and forth between polymerization and depolymerization.

U.S. Pat. No. 4,022,649 describes a metal laminate having high thermal stability which is produced by forming a cured film layer of a thermally stable heterocyclic polymer such as polyamide imide having only a small content of volatile compounds on at least one surface of one or both of metal plates or foils, for example, of aluminum, separately forming an adhesive layer of a thermally stable heterocyclic polymer having a thickness of one-third or less of the above mentioned film layer and containing a volatile matter in an amount of not more than 20% by weight, and then heat bonding both of the metal plates or foils through the above mentioned adhesive layer with the film layer being oriented toward the adhesive layer. The described polymer layer decomposes at temperatures above 300° C.

SUMMARY OF THE INVENTION

Therefore, an object of the present invention is to provide a method which permits a reversibly switchable cross-linking of monomers.

This objective is achieved according to the present invention by a method for the reversibly switchable cross-linking of monomers, including the steps of
a) cross-linking of monomers by adding complexable metal ions;
b) bond-breaking of the polymer formed in step a) by applying a direct voltage, by changing the pH value, or by changing the temperature; the monomers including compounds of at least one of the general formulas:

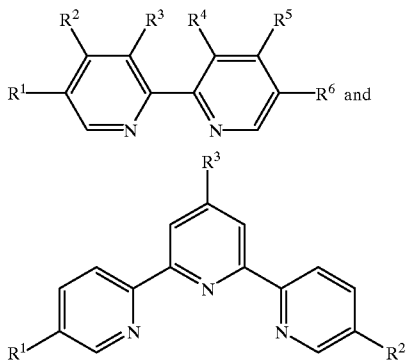

$R^1$ through $R^6$ being able to be equal or different and being selected from the group consisting of H, OH, $-NX_2$, $-OX$, $-SH$, $-SX$ with X being selected from alkyl and/or aryl groups which are terminally substituted by reactive residues selected from the group consisting of OH, $-CH(O)CH_2$, $-NCO$, $-COOH$ and $NZ_2$, with Z being selected from the group consisting of alkyl groups, aryl groups and a hydrogen atom, and one of the groups Z being a hydrogen atom with the proviso that not all residues $R^1$ through $R^6$ are hydrogen atoms at the same time; and
c) possibly, repeated cross-linking of the polymer bond-broken in step b) by applying a direct voltage opposite in polarity to that of step b), by changing the pH value, or by changing the temperature.

The complexable metal ions in step a) of the method according to the present invention may be selected from the group consisting of metal ions of groups II through XIV of the periodic system, in particular of iron, zinc, magnesium, titanium, aluminum, copper and cobalt ions.

In an embodiment of the method according to the present invention, the bond-breaking of the polymer formed in step a) and, possibly, the repeated cross-linking of the polymer bond-broken in step b) are carried out by applying a direct voltage of 0.5 to 1,000 V.

In another embodiment of the method according to the present invention, the bond-breaking of the polymer formed in step a) and, possibly, the repeated cross-linking of the polymer bond-broken in step b) are carried out by changing the pH to a pH value in the range from 2 to 13.

In yet another embodiment of the method according to the present invention, the bond-breaking of the polymer formed in step a) and, possibly, the repeated cross-linking of the polymer bond-broken in step b) are carried out by changing the temperature to a range from 30 to 250° C.

DETAILED DESCRIPTION

Figure 1:
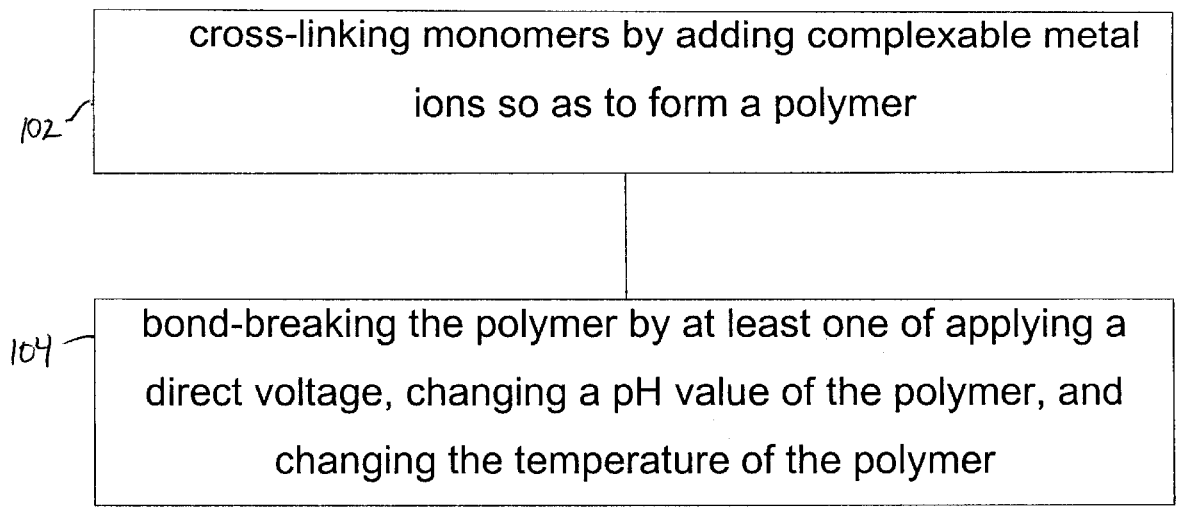
FIG. 1 shows a flow chart of a method for reversibly switchable cross/linking of polymers.

As shown in FIG. 1, in the method according to the present invention a cross-linking of monomers is performed by adding complexable metal ions so as to form a polymer (block 102). Then, a bond-breaking of the polymer is performed by at least one of applying a direct voltage, changing a pH value of the polymer, and changing the temperature of the polymer (block 104).

In the presence of suitable metal ions, special pyridine oligomer-containing monomers, for example, on the basis of 5,5'-substituted 2,2':6'2"-terpyridines, form cross-linked polymers in which the cross-links (metal complexes) can be selectively manipulated by the influence of temperature, pH value and/or electric current, the degree of cross-linking depending on the type of pyridine oligomers and their content in the polymer.

Using different metal ions, it is possible for the cross-linking conditions to be adjusted in a defined manner. By selectively using temperature and/or electric current, this cross-linkage can also be reversed. The process parameters are dependent on the nature of the metal ions used in the polymer for the complex formation. These polymerizations are reactions in the case of which it is possible to switch back and forth between cross-linking and bond-breaking into monomers or prepolymers, respectively, as often as desired.

The switchable cross-linking and bond-breaking of monomers can be carried out through different processes:
a) The cross-linking is carried out by adding a suitable metal ion. By changing the level of oxidation of the metal ion through the application of a direct voltage, by changing the temperature or by changing the pH value, it is possible to switch back and forth between the cross-linked and uncross-linked states.

b) A part of the pyridine oligomers is chemically bound onto surfaces of the parts to be joined. The cross-linking can be initiated by adding suitable metal ions. The switching is carried out analogously to the above described mechanisms.

In the case of the polymerization reactions according to the present invention, it is possible for the monomeric or oligomeric structural elements of the polymer to be recovered in a simple manner.

Such reactions can be used for quickly switching back and forth between adhesion and deadhesion of moving component parts. Complex holding devices are no longer necessary.

If this polymer is used as an adhesive, simple bond-breaking is possible for repair and/or recycling purposes. The amount of work required for separating component parts joined in this manner is relatively small.

The following example illustrates the present invention and is not to be understood in a limiting manner.

EXAMPLE a) Preparation of a Prepolymer

Bis(isophorone diisocyanate)-terminated poly(propylene glycol) (0.576 g, 0.230 mol) was dissolved in dry THF (10 ml), and two drops of diisobutyl tin dilaurate and 5,5"-bis(hydroxymethyl)-2,2':6',2"-terpyridine 2 (67.6 mg, 0.230 mol) in 25 ml dry THF was added to the solution. The mixture was stirred 70 h at 50° C. and then cooled down to room temperature. The prepolymer was precipitated in hexane (−40° C.) and recovered as a colorless oil in 57 percent yield (370 mg) using toluene subsequent to freeze drying.

$^1$H-NMR(CDCl$_3$):δ(ppm)0.80–3.0(m, 192 H), 3.38(m, 50 H), 3.52 (m, 88H), 4.58–5.17 (m, 8H), 7.83 (d, J=6.9 Hz, 2H, H$_{4,4"}$), 7.92 (t, J=7.6 Hz), 1H; H$_{4'}$), 8.41 (d, J=7.2 Hz, 2H, H$_{3',5'}$), 8.56 (d, J=7.2 Hz, 2H, H$_{3',3"}$), 8,65 (s, 2H, H$_{6',6"}$);

$^{13}$C-NMR(CDCl$_3$):δ(ppm) 17.27–18.46, 23.20–75.47, 120.84, 120.99, 135.57, 136.77, 137.82, 147.86, 148.88, 155.43;

GPC(CDCl$_3$, RI detection, polystyrene calibration): M$_n$=11880, M$_w$=16340, M$_w$/M$_n$=1.53.

b) Cross-linking of the Prepolymer

Cobalt(II)acetate tetrahydrate (8.9 mg, 35.90 mmol) was added to a solution of the prepolymer (100 mg) prepared in example 1 in methanol (2 ml), whereupon the resulting solution immediately turned brown. After stirring the mixture for five hours at room temperature, a solution of NH$_4$PF$_6$ (120 mg, 720 mmol) in methanol (1 ml) was added. After another hour, the solvent was removed under reduced pressure, and the residue was dissolved in acetone. Water was added to the solution and, in doing so, the cross-linked prepolymer was obtained as a reddish brown, rubber-like material in 93 percent yield (370 mg).

$^1$H-NMR(CDCl$_3$, relative intensities):δ(ppm)0.80–3.0(m, 75H), 3.40(m, 17H), 3.54 (m, 34H), 4.88 (s, 1H); UV/VIS (MeOH):λ$_{max}$/nm(ε/10$^4$·cm$^2$ mol$^{-1}$, 0.054 μmol metallic salt to 0.6 mg polymer)=326.0(3.26), 273.0(13.63).

c) Bond-breaking of the Cross-linked Prepolymer

By applying a direct voltage of approximately 30 V, the polymer formed in step b) is bond-broken into the prepolymer again.

What is claimed is:

1. A method for reversibly cross-linking monomers, the method comprising:
   cross-linking the monomers by adding complexable metal ions so as to form a polymer;
   bond-breaking the polymer by at least one of applying a direct voltage, changing a pH value of the polymer, and changing the temperature of the polymer;

the monomers having compounds of at least one of the general formulas

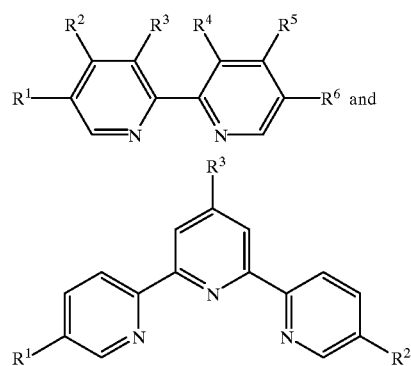

R$^1$ through R$^6$ being equal or different and being selected from the group consisting of H, OH, —NX$_2$, —OX, —SH, and —SX, X being selected from alkyl and/or aryl groups which are terminally substituted by reactive residues selected from the group consisting of OH, —CH(O)CH$_2$, —NCO, —COOH and NZ$_2$, Z being selected from the group consisting of alkyl groups, aryl groups and a hydrogen atom, one of the Z being a hydrogen, not all residues R$^1$ through R$^6$ being hydrogen atoms at a same time.

2. The method as recited in claim 1 wherein the direct voltage has a first polarity and further comprising causing a repeated cross-linking of the bond-broken polymer by at least one of applying a second direct voltage having a second polarity opposite to the first polarity, by changing the pH of the bond-broken polymer, and by changing the temperature of the bond-broken polymer.

3. The method as recited in claim 1 wherein the complexable metal are selected from the group consisting of metal ions of the groups II through XIV of the periodic system.

4. The method as recited wherein the complexable metal ions are selected from the group consisting of iron, zinc, magnesium, titanium, copper, aluminum and cobalt ions.

5. The method as recited in claim 1 wherein the bond-breaking is performed by applying the direct voltage, the direct voltage being in a range from 0.5 to 1,000 V.

6. The method as recited in claim 1 wherein the repeated cross-linking is performed by applying the direct voltage, the direct voltage being in a range from 0.5 to 1,000 V.

7. The method as recited in claim 1 wherein the bond-breaking is performed by changing the pH of the polymer to a pH value in the range from 2 to 13.

8. The method as recited in claim 1 wherein the repeating cross-linking is performed by changing the pH of the bond-broken polymer to a pH value in the range from 2 to 13.

9. The method as recited in claim 1 wherein the bond-breaking is performed by changing the temperature of the polymer to a range from 30 to 250° C.

10. The method as recited in claim 1 wherein the repeated cross-linking is performed by changing the temperature of the bond-broken polymer to a range from 30 to 250° C.

* * * * *